United States Patent
Myrah et al.

(10) Patent No.: US 9,032,071 B2
(45) Date of Patent: May 12, 2015

(54) SYSTEMS AND METHODS FOR REPRESENTING A SAS FABRIC

(75) Inventors: Michael G Myrah, Cypress, TX (US); Balaji Natrajan, Spring, TX (US); Sohail Hameed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 13/556,667

(22) Filed: Jul. 24, 2012

(65) Prior Publication Data

US 2014/0032737 A1    Jan. 30, 2014

(51) Int. Cl.
*G06F 15/173*    (2006.01)
*G06F 13/14*    (2006.01)

(52) U.S. Cl.
CPC ..................... *G06F 13/14* (2013.01)

(58) Field of Classification Search
CPC ......... G06F 13/10; G06F 13/38; G06F 13/42; G06F 12/02; G06F 3/067; G06F 3/0631; G06F 3/0653; H04L 63/20; H04L 67/327; H04L 67/1097
USPC ............... 709/224, 229; 710/36, 74, 113, 316
See application file for complete search history.

(56) References Cited

U.S. PATENT DOCUMENTS

| | | | |
|---|---|---|---|
| 6,792,511 B2 | 9/2004 | Hameed | |
| 6,966,003 B1 * | 11/2005 | Joseph et al. | 726/14 |
| 7,028,177 B2 | 4/2006 | Schultz et al. | |
| 7,644,168 B2 * | 1/2010 | Grieff et al. | 709/229 |
| 8,477,616 B1 * | 7/2013 | Rogers et al. | 370/235 |
| 8,589,607 B1 * | 11/2013 | Singh | 710/74 |
| 2006/0101171 A1 * | 5/2006 | Grieff et al. | 710/36 |
| 2006/0194386 A1 | 8/2006 | Yao et al. | |
| 2007/0121819 A1 * | 5/2007 | Kirn et al. | 379/88.13 |
| 2007/0162592 A1 * | 7/2007 | Marks et al. | 709/224 |
| 2008/0028107 A1 * | 1/2008 | Cherian et al. | 710/9 |
| 2008/0126857 A1 * | 5/2008 | Basham et al. | 714/25 |
| 2008/0168374 A1 | 7/2008 | Blinick et al. | |
| 2008/0189723 A1 * | 8/2008 | Elliott et al. | 719/326 |
| 2008/0228897 A1 | 9/2008 | Ko | |
| 2010/0064085 A1 | 3/2010 | Johnson et al. | |
| 2010/0122107 A1 * | 5/2010 | Arimilli et al. | 713/600 |
| 2011/0145452 A1 * | 6/2011 | Schilling et al. | 710/74 |
| 2011/0218779 A1 * | 9/2011 | Palisetti et al. | 703/2 |
| 2011/0246692 A1 * | 10/2011 | Valk et al. | 710/110 |
| 2011/0283028 A1 * | 11/2011 | Byers et al. | 710/107 |
| 2012/0166582 A1 * | 6/2012 | Binder | 709/217 |
| 2012/0284435 A1 * | 11/2012 | Myrah et al. | 710/74 |
| 2012/0311222 A1 * | 12/2012 | Bowles et al. | 710/315 |
| 2013/0067164 A1 * | 3/2013 | Velayudhan et al. | 711/114 |
| 2013/0145064 A1 * | 6/2013 | Radovanovic | 710/113 |
| 2013/0201316 A1 * | 8/2013 | Binder et al. | 348/77 |
| 2013/0246683 A1 * | 9/2013 | Natrajan et al. | 710/316 |
| 2013/0275648 A1 * | 10/2013 | Hameed et al. | 710/316 |
| 2014/0040510 A1 * | 2/2014 | Myrah et al. | 710/11 |
| 2014/0040648 A1 * | 2/2014 | Miller et al. | 713/323 |
| 2014/0052845 A1 * | 2/2014 | Nayak et al. | 709/224 |

* cited by examiner

*Primary Examiner* — Thu Ha Nguyen
(74) *Attorney, Agent, or Firm* — International IP Law Group, PLLC

(57) ABSTRACT

An example provides potential solutions for SAS fabrics. The example includes identifying one or more devices directly attached to an entry point switch. The example also includes identifying one or more SAS switches that are not directly attached to the entry point switch. The example further includes receiving a request for SAS fabric information. Additionally, the example includes generating a data model in a format adapted to direct a client to generate a representation of the SAS fabric. The data model includes the one or more devices directly attached to the entry point switch, and the one or more SAS switches that are not directly attached to the entry point switch.

20 Claims, 5 Drawing Sheets

100

300

400

SYSTEMS AND METHODS FOR REPRESENTING A SAS FABRIC

BACKGROUND

The original small computer system interface (SCSI) protocol was developed to provide a common interface that could be used across peripheral platforms and system applications. Multiple generations of the parallel SCSI protocol successively doubled bandwidths, while also increasing signal degradation, and signal skew. The Serial Attached SCSI (SAS) protocol inherits its command set from parallel SCSI. The SAS architecture solves the parallel SCSI problems of bus contention, clock skew, and signal degradation at higher signaling rates, thereby providing performance headroom to meet enterprise storage needs. Further, serial attached SCSI devices provide access to multiple storage facilities over a single bus.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

A SAS fabric represents a network of computing devices accessing storage using the SAS protocol. Visual representations, e.g., device trees, of a SAS fabric are useful for maintaining and administrating the SAS fabric. However, a device tree of the SAS fabric may include a large data model, which makes it impractical to store on an individual device. Further, maintaining a data model of an entire SAS fabric is expensive in terms of system RAM usage, especially for a maximum configuration SAS fabric. To make it possible to see the entire SAS fabric from each SAS switch would mean maintaining a data model of N maximum configurations, which is not technically feasible, nor practical.

In an example system having interconnected SAS switches, a representation of the entire SAS fabric may be generated using any switch in the fabric as a single point of access. This may be done while having each SAS switch maintain a data model that meets the constraints of the typical SAS switch.

Figure 1:
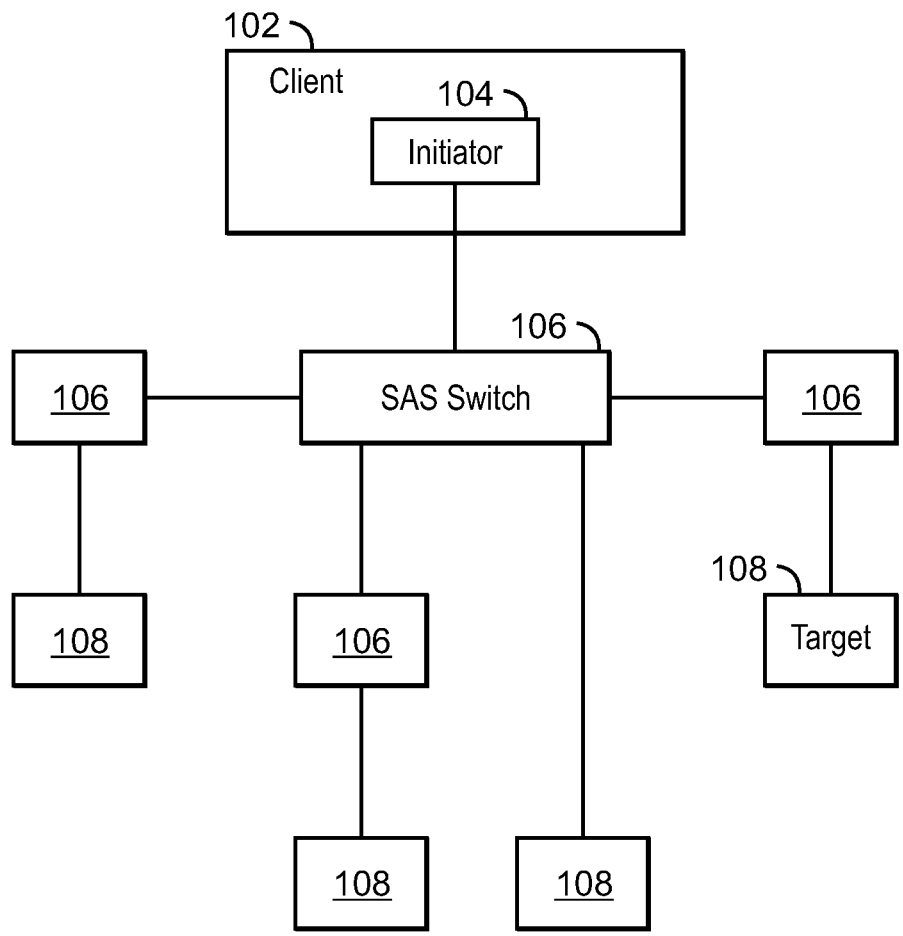
FIG. 1 is a block diagram of devices in an example SAS fabric.

FIG. 1 is a block diagram of devices in an example SAS fabric 100. The SAS fabric 100 includes clients 102, initiators 104, targets 106, and SAS switches 108. The clients 102 are computing devices that read and write data, commands to, and from, targets 106, i.e., storage devices. The data and commands are routed along the SAS fabric 100 in the form of packets, which are formatted according to various communication protocols. The clients 102 include an initiator 104. The initiator 104 may be an array controller containing the ports that interface with the SAS fabric 100. Clients 102, targets 106, and SAS switches 108 are also connected to each other via Ethernet. The targets 106 may include SAS hard drives and serial advanced technology attachment (SATA) hard drives, which advantageously share an electrical and physical connection interface.

The SAS switches 108 establish connections between initiators 104, targets 106, and other SAS switches 108 by receiving packets in one port, and routing the packets to another port based on an SAS address of the target 106.

The SAS switch 108 typically uses three routing methods: direct, table, and subtractive. The SAS switch 108 uses direct routing to forward commands and data to targets 106 that are directly attached. The SAS switch 108 uses table routing to forward commands and data to another SAS switch 108 or expander-based SAS device. The expander-based SAS device is any device that contains a SAS expander, such as a storage enclosure that contains SAS expanders. When the SAS switch 108 does not recognize an address for the target 106, the SAS switch 108 uses subtractive routing to forward the commands and data to another SAS device that does recognize the address.

Connecting SAS switches together enables the creation of large SAS fabrics 100. In fact, the number of initiators 104 and targets 106 in a SAS fabric 100 can be expanded merely by expanding the sizes of routing tables in the SAS switches 108. Typically, the SAS switch 108 has the view of the entire SAS fabric 100. However, maintaining such a view for large SAS fabrics may exceed the available memory on the SAS switch 108. Accordingly, the information available from each SAS switch 108 is limited to information about the initiators 104 and targets 106 that are directly attached to the SAS switch 108. Connected SAS switches are also referred to herein as trunked SAS switches.

In this way, the example SAS fabric 100 can generate a visual representation of the entire SAS fabric 100 from the perspective of a single SAS switch 108. This may be done while maintaining a data model on the SAS switches 108 that does not exceed typical technical, e.g., memory, constraints.

Figure 2:
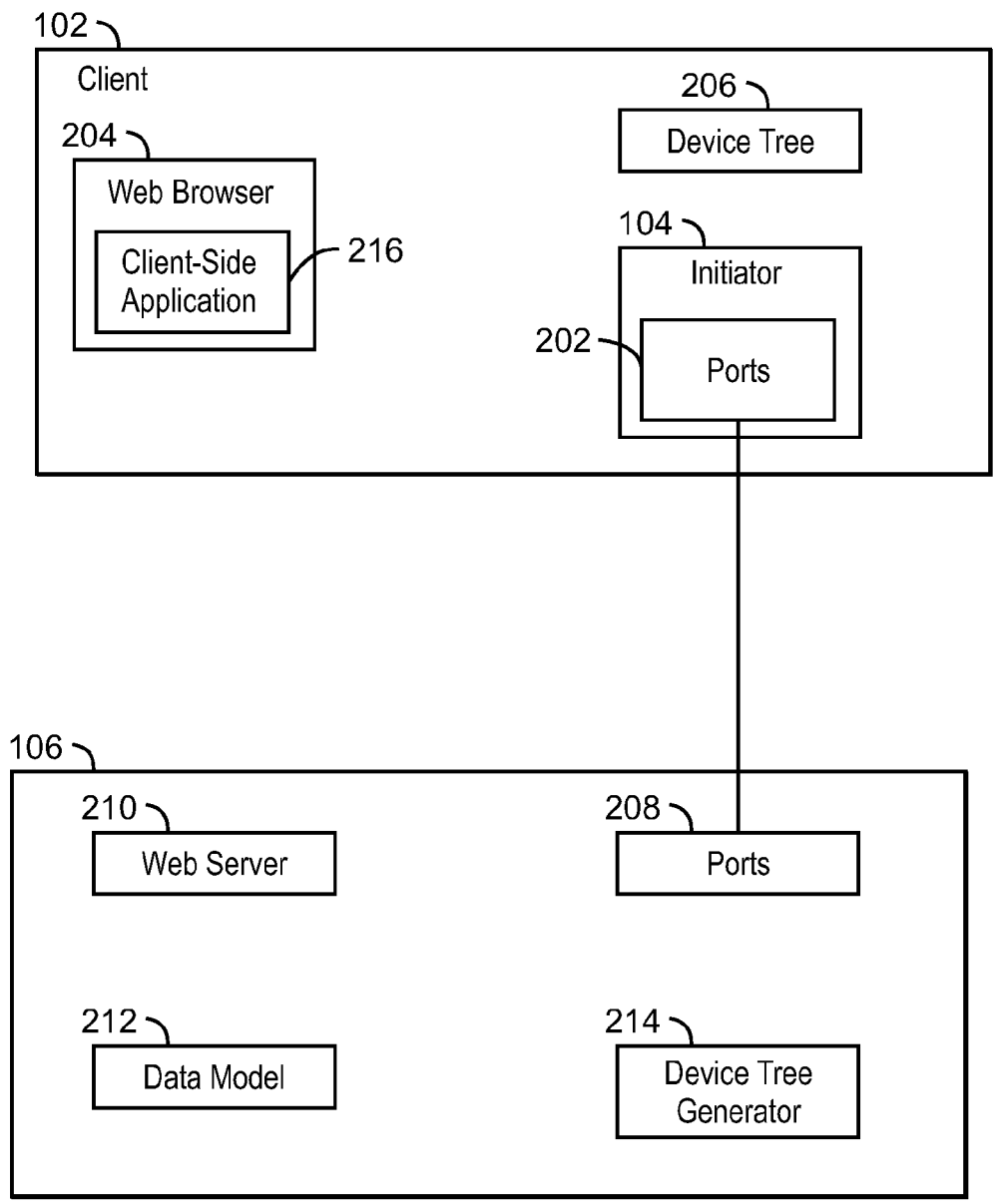
FIG. 2 is a block diagram of an example client and SAS switch in the SAS fabric.

FIG. 2 is a block diagram of an example client 102 and SAS switch 108 in the SAS fabric 100. The client 102 includes initiator 104 with ports 202. The client 102 also includes a web browser 204, and device tree 206. The web browser 204 queries the SAS switch 108 in an exchange that generates a visual representation of the SAS fabric 100, e.g., device tree 206. The device tree 206 represents all the devices (initiators 104, targets 106, SAS switches 108) in the SAS fabric 100 from the perspective of the queried SAS switch 108. The device tree 206 may be displayed on the client 102, and may be rendered graphically by the web browser 204 using client-side techniques such as JavaScript, dynamic hypertext markup language (DHTML), hypertext markup language version 5 (HTML5), extensible markup language (XML), and so on. It is understood that the device tree 206 is an example visual representation. However, other representations are possible in example implementations.

The SAS switch 108 includes SAS switch ports 208, a web server 210, a data model 212, and a device tree generator 214. The web server 210 may process hypertext transfer protocol (HTTP) requests from the client 102, or other devices in, or in communication with, the SAS fabric 100.

The data model 212 includes data about all of the initiators 104 and targets 106 attached directly to the SAS switch ports 208. The data model 212 may also include peripheral information, such as cabling details and access information. The data model 212 does not model details of all of the initiators 104 and targets 106 attached to other SAS switches 108, although some exceptions exists, such as route table information and the like.

However, the data model 212 may include a directory of each SAS switch 108 in the SAS fabric 100, and the number of hops away from this SAS switch 108. A hop represents a network link disposed between the SAS switches 108. The other SAS switches may be represented as stubs (not shown) within the data model 212. The stubs contain the IP address of the other SAS switches 108. The location of each stub in the data model 212 is related to the number of hops for the corresponding SAS switch 108.

In response to a request from the client 204, the web server 210 may invoke the device tree generator 214. The device tree generator 214 provides the data model 212 to the client 204, using a data-interchange format, such as JavaScript object notation (JSON) XML, HTML5, and the like. In this way, a client-side application 220 may use the data model 212, and stubs to display the device tree 206 including the entire SAS fabric 100. In one example, the client-side application 220 retrieves data models 212 from SAS switches that are not connected to the entry point. The entry point is the SAS switch 108 which receives the device tree request from the client 204. The displayed device tree 206 is generated by combining these data models 212.

Figure 3:
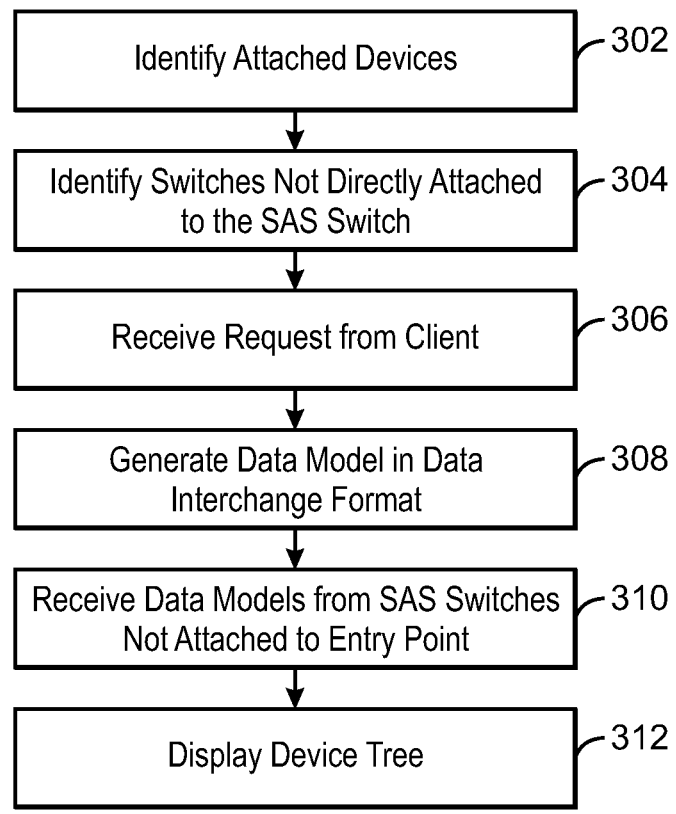
FIG. 3 is a process flow diagram of a method for generating a visual representation of the SAS fabric.

FIG. 3 is a process flow diagram of a method 300 for generating a visual representation of the SAS fabric 100. The method 300 may be performed by the client 204 and the device tree generator 214. Further, blocks 302-304 are performed for each SAS switch 108 in the fabric 100. However, blocks 306-320 are performed for the entry point. The method 300 begins at block 302, where the device tree generator 214 identifies the devices that are directly attached to the SAS switch 108. The SAS switch 108 performs Discovery for the full SAS fabric 100. Discovery is a process whereby the device tree generator 214 crawls the full SAS fabric 100 to discover all attached devices. However, the SAS switch 108 does not record detailed device information of end devices that are not directly attached to the SAS switch 108 performing the Discovery. For example, if SAS switch #1 performs Discovery, and determines that SAS switch #2 has a storage enclosure with hard drives, SAS switch #1 does not record the hard drive serial numbers. However, if SAS switch #1 has a storage enclosure with hard drives directly connected to one of its ports, SAS switch #1 records the hard drive serial numbers. In this way, each SAS switch 108 is merely configured with enough resources, e.g., RAM, to maintain a data model 212 of devices directly attached. Information about the SAS fabric 100, such as IP addresses of the attached devices, may be stored in the data model 212.

At block 304, the device tree generator 214 identifies the SAS switches 108 that are in the SAS fabric, but not directly attached to a particular SAS switch 108. The IP addresses and hop distances of these "un-attached" SAS switches may be stored in the stubs of the data model 212.

At block 306, the device tree generator 214 for the entry point receives a request for SAS fabric information from the client 204. At block 308, the device tree generator 214 generates the data model 212 in a data interchange format, such as JSON. The data interchange format may direct the client-side application 220 to generate the representation for display. Alternatively a server device outside the SAS fabric 100 may generate the data-interchange-formatted data model 212 in response to a request from the SAS switch 106.

At block 310, the client-side application 220 dynamically retrieves data models 212 from the SAS switches 108 that are not directly connected to the entry point. This may be done using cross-domain techniques, such as asynchronous JavaScript (AJAX). At block 312, the client 204 displays the device tree 206. This may be done by graphically rendering the device tree 206, representation of the SAS fabric 100, including all of the trunked SAS switches 108.

Figure 4:
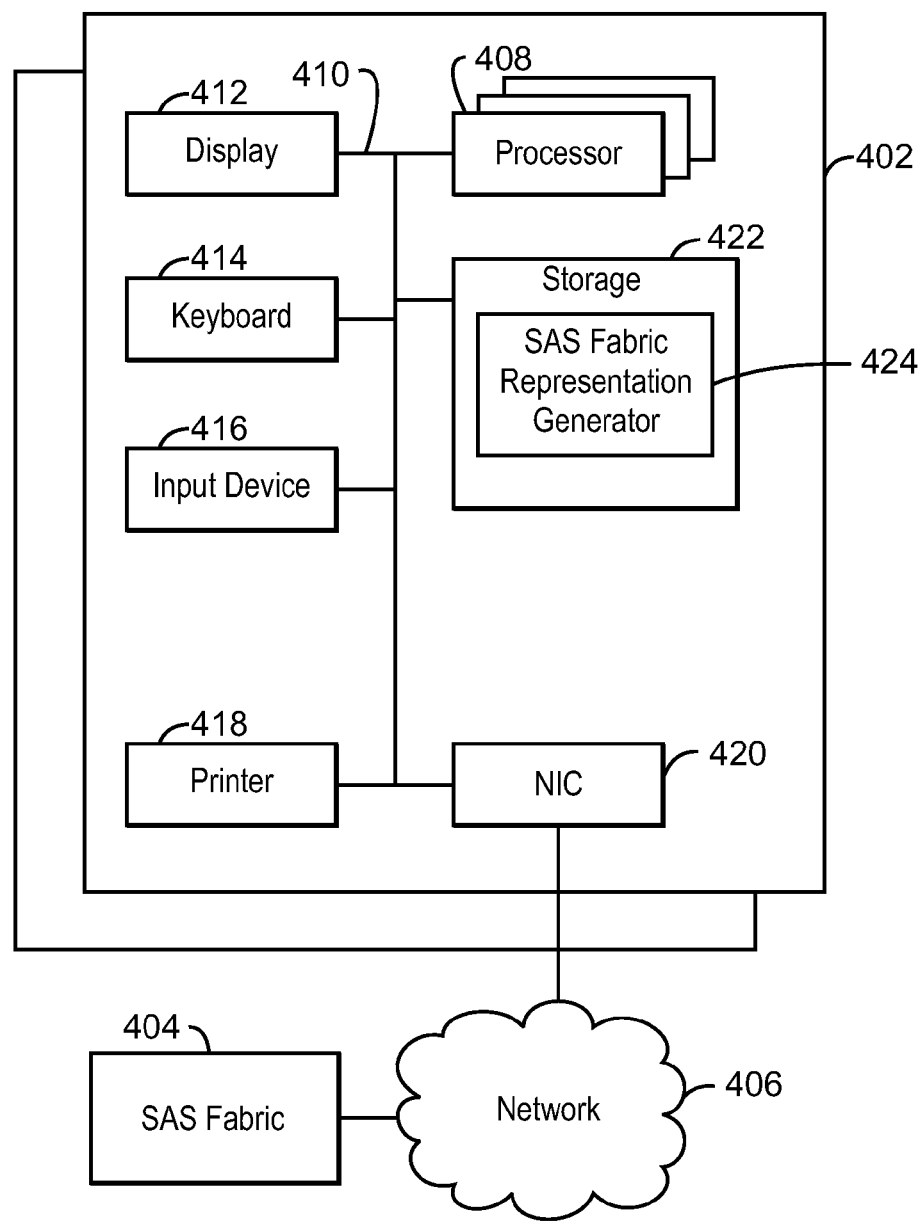
FIG. 4 is a block diagram of a system for representing the SAS fabric.

FIG. 4 is a block diagram of a system 400 for representing the SAS fabric 100. The functional blocks and devices shown in FIG. 4 may comprise hardware elements, software elements, or some combination of software and hardware. The hardware elements may include circuitry. The software elements may include computer code stored as machine-readable instructions on a non-transitory, computer-readable medium. Additionally, the functional blocks and devices of the system 400 are but one example of functional blocks and devices that may be implemented in an example. Specific functional blocks may be defined based on design considerations for a particular electronic device.

The system 400 may include a coordinator server 402, and a SAS fabric 404, in communication over a network 406. The coordinator server 402 may include a processor 408, which may be connected through a bus 410 to a display 412, a keyboard 414, an input device 416, and an output device, such as a printer 418. The input devices 416 may include devices such as a mouse or touch screen. The server node 402 may also be connected through the bus 410 to a network interface card 420. The network interface card 420 may connect the server 402 to the network 406. The network 406 may be a local area network, a wide area network, such as the Internet, or another network configuration. The network 406 may include routers, switches, modems, or any other kind of interface device used for interconnection. In one example, the network 406 may be the Internet.

The coordinator server 402 may have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory.

The storage 422 may include the machine readable instructions used in examples of the present techniques. In an example, the storage 422 may include SAS fabric representation generator 424. Similar to the device tree generator 214, the SAS fabric representation generator 424 may provide the data model 212 in an interchange data format to a client of the SAS fabric, whereby the client generates a visual representation of the SAS fabric 404 on the display 412.

Figure 5:
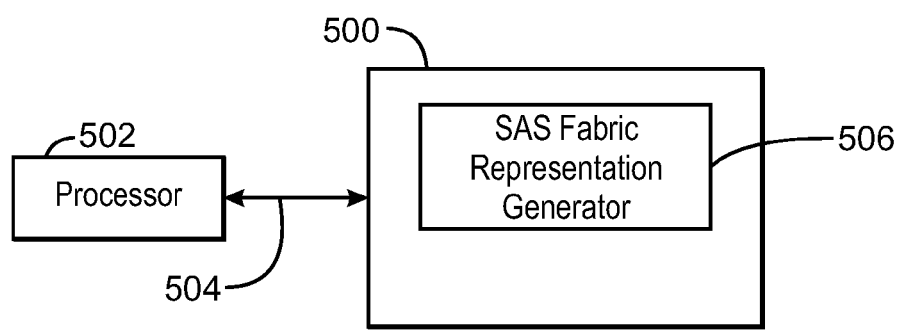
FIG. 5 is a block diagram showing a tangible, non-transitory, machine-readable medium that stores code for generating a visual representation of the SAS fabric.

FIG. 5 is a block diagram showing a tangible, non-transitory, machine-readable medium that stores code for generating a visual representation of an SAS fabric. The machine-readable medium is generally referred to by the reference number 500. The machine-readable medium 500 may correspond to any typical storage device that stores computer-implemented instructions, such as programming code or the like. As shown, the machine-readable medium may be connected to a processor, over an interconnect 504 or other bus. Moreover, the machine-readable medium 500 may be included in the storage 422 shown in FIG. 4.

When read and executed by a processor 502, the instructions stored on the machine-readable medium 500 are adapted to cause the processor 502 to generate a visual representation of an SAS fabric. The medium 500 includes a SAS fabric representation generator 508 may store a data model representing devices directly attached to an SAS switch, and SAS switches in the SAS fabric that are not directly attached.

The SAS fabric generator 508 provides the data model to a client that generates the visual representation. The data model is provided in a data interchange format.

The block diagram of FIG. 5 is not intended to indicate that the tangible, non-transitory computer-readable medium 500 is to include all of the components shown in FIG. 4. Further, any number of additional components may be included within the tangible, non-transitory computer-readable medium 500, depending on the details of a specific implementation.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method for generating a representation of a serial-attached storage (SAS) fabric comprising a plurality of trunked SAS switches, comprising:
   identifying one or more devices directly attached to an entry point switch;
   identifying one or more SAS switches that are not directly attached to the entry point switch;
   receiving a request for SAS fabric information; and
   generating a data model in a format adapted to direct a client to generate the representation, the data model comprising:
      the one or more devices directly attached to the entry point switch; and
      the one or more SAS switches that are not directly attached to the entry point switch.

2. The method of claim 1, comprising:
   receiving the data model;
   dynamically retrieving one or more data models for the SAS switches that are not directly attached to the entry point switch; and
   generating the representation based on the received data model and the retrieved data models.

3. The method of claim 2, wherein the one or more data models are retrieved using cross-domain techniques.

4. The method of claim 3, wherein the cross-domain techniques comprise AJAX.

5. The method of claim 1, wherein the format comprises one of JSON, XML, and HTLM5.

6. The method of claim 1, wherein the devices comprise a plurality of initiator devices, a plurality of target devices, and a plurality of SAS switches.

7. The method of claim 6, wherein the target devices comprise storage devices.

8. The method of claim 7, wherein the storage devices comprise SAS storage devices and SATA storage devices.

9. The method of claim 1, wherein the representation comprises a device tree.

10. A system comprising:
    at least one processor; and
    at least one memory device comprising instructions that when executed cause the at least one processor to:
    identify one or more devices directly attached to an entry point switch;
    identify one or more SAS switches that are not directly attached to the entry point switch;
    receive a request for SAS fabric information; and
    generate a data model in a format adapted to direct a client to generate the representation, the data model comprising:
       the one or more devices directly attached to the entry point switch; and
       the one or more SAS switches that are not directly attached to the entry point switch.

11. The system of claim 10, wherein the memory device comprises instructions that when executed cause the at least one processor to:
    receive the data model;
    dynamically retrieve one or more data models for the SAS switches that are not directly attached to the entry point switch; and
    generate the representation based on the received data model and the retrieved data models.

12. The system of claim 11, wherein the one or more data models are retrieved using cross-domain techniques.

13. The system of claim 12, wherein the cross-domain techniques comprise AJAX.

14. The system of claim 10, wherein the format comprises one of JSON, XML, and HTLM5.

15. The system of claim 10, wherein the devices comprise a plurality of initiator devices, a plurality of target devices, and a plurality of SAS switches.

16. The system of claim 15, wherein the target devices comprise storage devices.

17. The system of claim 16, wherein the storage devices comprise SAS storage devices and SATA storage devices.

18. A non-transitory, computer-readable medium comprising processor-executable instructions that when executed cause a processor to:
    identify one or more devices directly attached to an entry point switch;
    identify one or more SAS switches that are not directly attached to the entry point switch;
    receive a request for SAS fabric information; and
    generate a data model in a format adapted to direct a client to generate the representation, the data model comprising:
       the one or more devices directly attached to the entry point switch; the one or more SAS switches that are not directly attached to the entry point switch;
    receive the data model;
    dynamically retrieve one or more data models for the SAS switches that are not directly attached to the entry point switch; and
    generate the representation based on the received data model and the retrieved data models.

19. The non-transitory, computer-readable medium of claim 18, wherein the one or more data models are retrieved using AJAX cross-domain techniques, and wherein the format comprises one of JSON, XML, and HTLM5.

20. The non-transitory, computer-readable medium of claim 18, wherein the devices comprise a plurality of initiator devices, a plurality of target devices comprising SAS storage devices.

* * * * *